United States Patent [19]

Liu

[11] Patent Number: 4,652,602

[45] Date of Patent: Mar. 24, 1987

[54] BLOW-MOLDABLE POLYCARBONATE RESIN COMPOSITIONS

[75] Inventor: Ping Y. Liu, Naperville, Ill.

[73] Assignee: General Electric Company, Mt. Vernon, Ind.

[21] Appl. No.: 741,304

[22] Filed: Jun. 4, 1985

[51] Int. Cl.$^4$ ................................................. C08K 3/34
[52] U.S. Cl. .................................... 524/449; 524/505; 524/611
[58] Field of Search ................... 524/449, 611, 505

[56] References Cited

U.S. PATENT DOCUMENTS

| 3,488,317 | 1/1970 | Hechelhammer et al. | 524/611 |
|---|---|---|---|
| 3,577,378 | 5/1971 | Streib et al. | 524/611 |
| 3,678,079 | 7/1972 | Carty | 524/611 |
| 4,001,184 | 1/1977 | Scott | 528/182 |
| 4,056,504 | 11/1977 | Grundmeier et al. | 525/439 |
| 4,469,852 | 9/1984 | Tyrell et al. | 525/468 |
| 4,469,861 | 9/1984 | Mark | 568/723 |
| 4,474,999 | 10/1984 | Mark | 568/720 |
| 4,478,964 | 10/1984 | Carter | 524/449 |
| 4,537,930 | 8/1985 | Bussink et al. | 524/505 |

FOREIGN PATENT DOCUMENTS 873937  6/1971  Canada ............................... 524/611

Primary Examiner—Lewis T. Jacobs
Attorney, Agent, or Firm—Joseph T. Eisele; Martin B. Barancik

[57] ABSTRACT

Articles of blow-molded polycarbonate resins are described, having improved flexural modulus. The method of improvement comprises the incorporation of mica particles or glass fiber into the blow-moldable resin as a reinforcing filler. Advantageously the incorporation does not significantly adversely affect the blow-moldability of polycarbonate resins.

10 Claims, No Drawings

BLOW-MOLDABLE POLYCARBONATE RESIN COMPOSITIONS

BACKGROUND OF THE INVENTION

1. Field of the Invention

The invention relates to thermoplastic resin compositions and more particularly relates to improved blow-moldable polycarbonate resin compositions and articles molded therefrom and the method of improvement.

2. Brief Description of the Prior Art

Aromatic polycarbonate resins are a well known class of synthetic polymeric resins, generally prepared by the reaction of a polyhydric phenol with a carbonate precursor; see for example U.S. Pat. No. 3,989,672. Although such polycarbonate resins have been found to be thermoplastically moldable under a broad range of molding conditions, only select polycarbonate resin compositions are suitable for blow-molding. This is due to the unique requirements of thermoplastic resin for blow-molding operations.

In the conventional blow-molding operation, a tube of the heat-softened polycarbonate resin may be extruded vertically downward into a mold. The extrudate is then pressed unto the mold surfaces with a pressurized gas flow (usually air or inert gas), shaping the heat-softened resin. As appreciated by those skilled in the art, the successful molding of a given thermoplastic resin is dependent upon a number of factors, including the characteristics and physical properties of the heat-softened resin. Among resin properties to be considered are the melt viscosity and the melt strength of the resin. These two factors alone are of considerable importance in the successful blow-molding of any resin, particularly in regard to the molding of large articles.

Many aromatic polycarbonate resins are eminently useful in blow-molding operations because they meet the necessary requirements of melt viscosity, melt strength and other desirable physical properties; see for example the blow-moldable polycarbonate resins described in the U.S. Pat. Nos. 4,001,184 and 4,474,999. However, articles, particularly relatively large articles fabricated by blow-molding the known polycarbonate resin compositions have not been completely satisfactory in all respects. In particular, the prior art moldings may have an inherent lack of a relatively high flexural modulus.

The U.S. Pat. No. 4,469,852 has described the increase of flexural modulus in articles thermoplastically molded from polycarbonate resins by the addition of certain reinforcing fillers to the molding compositions. Representative of the suggested fillers are glass fibers; see also U.S. Pat. No. 4,056,504. Apart from reinforcing fillers, mica has been suggested also as a filler in thermoplastically moldable polycarbonate resin compositions; see U.S. Pat. No. 4,469,861. However, it is generally accepted that the presence of prior art filler materials in polycarbonate resin compositions will adversely affect blow-moldability, impact resistance and other desirable characteristics of polycarbonate.

We have now found that polycarbonate articles of improved flexural modulus may be obtained by the blow-molding of particular polycarbonate resin compositions containing particular reinforcing fillers, preferably mica. Blow-moldability of the composition is not significantly adversely affected by the presence of the selected fillers and high deflection temperature under load as well as high flexural modulus can be obtained.

SUMMARY OF THE INVENTION

The invention comprises a method of improving the flexural modulus of articles blow-molded from a polycarbonate resin composition without significantly adversely affecting the blow-moldability of the resin composition, which comprises; homogeneously blending into said composition a reinforcing agent selected from the group consisting of mica particles and glass fibers.

The invention also comprises blow-molding compositions, which comprise; a blow-moldable polycarbonate resin and a reinforcing proportion of mica particles and/or glass fibers.

The invention also comprises articles blow-molded from compositions of the invention. The articles of the invention are useful as bottles, automotive components and the like. In addition to improved flexural strength properties, the improved articles of the invention resist degradation by hydrocarbon solvents such as gasoline and the like.

DETAILED DESCRIPTION OF THE PREFERRED EMBODIMENTS OF THE INVENTION

Blow-moldable polycarbonate resins may be prepared by the reaction of a polyhydric phenol with a carbonate precursor such as phosgene, a halo-formate or a carbonate ester. Preferably the resins are branched polycarbonates. The method of preparation is well known; see for example the method described in U.S. Pat. Nos. 4,001,184 and 4,474,999, both of which are herein incorporated by reference.

In general, the blow-moldable polycarbonate resins are typified as possessing recurring structural units of the formula:

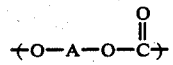

wherein A is a divalent aromatic moiety of the polyhydric phenol employed in the polymerization reaction. Preferably, the polycarbonate resin will have an intrinsic viscosity (as measured in methylene chloride at a temperature of 25° C.) ranging from about 0.30 to about 1.00 deciliters/gram. However, this is not a limiting factor in the choice of a particular polycarbonate resin. Any polycarbonate resin may be employed as the base resin component in the method and the compositions of the invention, which is blow-moldable. In general, such polycarbonate resins will have an R* value, as hereinafter defined, within the range of from about 1.4 to about 4.1. The preferred branched polycarbonate resins generally exhibit an R* value of from about 3.8 to about 4.1. When an impact modifier is added to the polycarbonate resin, as described hereinafter, the preferred R* value of the resulting composition may advantageously be within the range of from about 2.5 to about 5.3 or higher depending on the size of the article being molded and the nature and proportion of the impact modifier added.

Generally, the polycarbonate resin comprises from 65 to 95 parts by weight of the compositions and the articles of the invention, preferably 75 to 90 parts, most preferably 85 to 88 parts.

The method of the invention may be carried out by a homogeneous blending of mica particles and/or glass fiber reinforcing agents into the blow-moldable polycarbonate resin. The blending may be carried out by adding a reinforcing proportion of the reinforcing additive and mixing the two components with conventional technique and apparatus. In general, the mixtures may be blended by pre-mixing in conventional mixing rolls, dough mixers, Banbury mixers and the like and blending the pre-mix in an extruder or fluxing it on a mill at an elevated temperature sufficient to achieve a homogeneous melt blending. Upon cooling, the blend may be pelletized and stored for use in a blow-molding operation.

The term "reinforcing proportion" as used herein means a proportion of the mica particles or glass fibers sufficient to improve the flexural modulus of articles molded from the resin mixture. In general, a reinforcing proportion of mica particles is within the range of from about 1 to about 25 parts by weight of the composition, preferably 5 to 23 parts and most preferably 10 to 20 parts. A reinforcing proportion of glass fiber is within the range of from about 1 to about 25 parts by weight of the composition, preferably 5 to 15 parts and most preferably 6 to 10 parts. Mixtures of mica particles and glass fibers may also be used, in appropriate proportions. The preferred articles of the invention contain mica particles.

Advantageously the mica employed is selected from muscovite and phlogopite minerals (also known as bronze mica or brown mica). Mica is commercially available from a number of sources in particle form (flakes and powders). Particularly preferred are the so-called "untreated" mica particles of a size convenient to use as a filler, i.e.; the majority of which will pass through a 60 to 350 mesh U.S. sieve.

Glass fiber is also readily available from commercial sources. Preferably the glass fiber employed in the compositions of the invention are filaments of lime-aluminum borosilicate glass that is relatively soda-free. Such glass is often referred to as "E glass". Other glass which is relatively soda-free includes "C glass". The glass fiber used in the compositions of the invention may have a wide variety of diameters and lengths. Representative of fiber diameters are those within the range of from about 0.07 to 0.2 mm. Preferred are chopped fibers having lengths of from 3.0 to 25 mm, most preferably less than 6.5 mm.

As may be expected, incorporation of mica particles and/or glass fiber into a blow-moldable polycarbonate resin composition lowers the impact strength of the blow-molded article. To compensate for this, in a preferred embodiment of the invention an impact strength enhancing proportion of an impact modifier may be added to the compositions of the invention. Representative of such impact modifiers are selectively hydrogenated linear, sequential or radial teleblock copolymers of a vinyl aromatic compound (A) and $(A')_n$ and an olefinic elastomer (B) of the A-B-A'; $A(B-A-B)_nA$; $A(B-A)_nB$; or $B[(A-B_n)B]_4$ type wherein n is an integer of from 1 to 10, inclusive. These copolymers may be prepared by known methods; see the description given in the U.S. Pat. No. 4,481,331. Commercially available copolymers include for example Kraton G ®-1650 and Kraton G ®-1651 available from Shell Chemical Company. The Kraton G ® has a significant quantity of the residual aliphatic unsaturation removed by selective hydrogenation. Other representative impact modifiers are the synthetic polymeric resin elastomers such as ethylene/vinyl acetate rubber, silicone rubber, polyether rubber and ethylene-propylene-diene rubber; diene rubbers, i.e., homopolymers of conjugated dienes having, e.g. 4 to 8 carbon atoms, such as butadiene, isoprene, piperylene and chloroprene; and copolymers of dienes with each other or with styrene, acrylic acid, methacrylic acid, or derivatives thereof (e.g., acrylonitrile, methacrylonitrile, acrylic acid, methacrylic acid, butyl acrylate and methyl methacrylate), or isobutylene. Preferably, the rubber is selected from among butadiene, butadiene/styrene, butadiene/methyl methacrylate, butadiene/butyl acrylate, ethylene/propylene/diene and butadiene/acrylonitrile rubbers.

Preferred synthetic polymeric resin elastomers are the Kraton G ® polymers.

An impact-modifying proportion of the impact modifiers described above is generally within the range of from about 0.05 to 15 parts by weight of the composition, preferably from 3–10 parts, most preferably 4 to 8 parts.

The following examples describe the manner and process of making and using the invention and set forth the best mode contemplated by the inventor for carrying out the invention but are not to be construed as limiting the scope of the invention. All parts are by weight. Test results are in accordance with the following test methods.

R*: The R* value is an indication of blow-moldability of the compositions of the invention. In general, an R* value of between about 1.4 and about 5.3 is an indication of blow-moldability as described in more detail above. The R* value may be calculated as follows:

STEP 1—Generate viscosity ($\eta$*) and elastic modulus (G') data on test compositions at three temperatures, with a rotational rheometer such as the RDS 7000, (Rheometrics Inc.).

STEP 2—Using the data from STEP 1 fitted to the Arrhenius type equations, calculate optimum melt temperature for parison extrusion (i.e. the temperature required to yield a melt viscosity of 20,000 poise at 100 $\sec^{-1}$).

STEP 3—Calculate the ratio of viscosity at low shear rate (1 $\sec^{-1}$ nominal) to viscosity at 100 $\sec^{-1}$ (20,000 poise), R*, at temperature estimated in STEP 2. Elastic modulus values (@ 1 $\sec^{-1}$) are also calculated at this temperature.

Flexural Modulus: ASTM test method D-790
Deflection Temperature Under Load (DTUL):
  ASTM test method D-648 at a load of 18.6 Kg/cm$^2$ in 0° C.
Notched Izod Impact Strength:
  ASTM test method D-256

EXAMPLE 1

Eighty-five parts by weight of a branched polycarbonate prepared in accordance with the description given in U.S. Pat. No. 4,101,184 and having an intrinsic viscosity of from about 0.5 to about 0.65 deciliters/gram (dl/g) as determined in a methylene chloride solution at a temperature of 25° C. (LEXAN ® 155, General Electric Co.) is mixed with 10 parts of phlogopite mica flakes[1]. (Suzorite 150-S; Marietta Resources International, Ltd.-Society Minerolurgique Laviolette, Inc., 1301 Avenue of the Americas, New York, N.Y. 10019) and 5 parts of a selectively hydrogenated styrene-butadiene-styrene block copolymer (Kraton ® G-1651; Shell Chemical Co.). The mixture is uniformly blended together in a laboratory tumbler and the blend then introduced into a melt extruder. The extrudate is pelletized and the pellets are fed to an injection molding machine to mold test bars of 5.715 cm×1.27 cm with a thickness of 3.175 mm. The moldings are subjected to tests to determine their blow-moldability (R* value), flexural modulus, deflection temperature under load (DTUL) and notched Izod impact strength. The test results are given in the Table, below.

1. The flakes have a bulk density of 208–288 Kg/m$^3$ and exhibit a nominal screen analysis as follows:
   +60 mesh—4%
   +60 to +100 mesh—40–55%
   +100 to +200 mesh—35–50%
   +200 mesh—0–10%

The procedure of Example 1, supra, is repeated except that the mica flakes are omitted from the resin mixture. The test results obtained are given in the Table, below.

All of the resin compositions prepared in accordance with the Examples 1–7, supra., are readily blow-molded into articles such as bottles and automotive parts having large dimensions exhibiting the same physical properties assigned to the resin compositions from which they are molded, in the Table, below. These articles may be characterized in part as possessing a flexural modulus of preferably at least 27,000 Kg/cm$^2$ and a notched Izod impact strength of at least 5 Kg-cm/cm.

TABLE

| EXAMPLE | BLEND COMPONENT PARTS BY WEIGHT | | | | R* | FLEX MODULUS (Kg/cm$^2$) | DTUL (°C.) | NOTCHED IZOD IMPACT STRENGTH **(Kg-cm/cm) |
|---|---|---|---|---|---|---|---|---|
| | POLYCARBONATE | MICA | GLASS FIBER | KRATON G-1651 | | | | |
| 1 | 85 | 10 | — | 5 | 4.1 | 33530 | 139 | 18.0 |
| 2 | 85 | — | 10 | 5 | 3.0 | 27240 | 136 | 28.8 |
| 3 | 85 | 5 | 5 | 5 | 3.8 | 29590 | 138 | 14.7 |
| 4 | 80 | 10 | 5 | 5 | 2.9 | 39450 | 140 | 16.2 |
| 5 | 75 | 10 | 5 | 10 | 3.3 | 33550 | 138 | 17.4 |
| 6 | 90 | 10 | — | — | 3.8 | 38590 | 138 | 5.4 |
| 7 Control | 100 | — | — | — | 3.9 | 23930 | 132 | 80.6 |

*Blow-moldability.
**All specimens were 100% ductile at failure except No. 6 which is 0% ductile.

using U.S. standard sieves.

EXAMPLE 2

The procedure of Example 1, supra, is repeated except that the mica flakes as used therein are replaced with an equal proportion of chopped glass fibers OCF 415 BB (Owens-Corning Fiberglass Company; E glass, 0.3175 mm). The test results obtained are given in the Table, below.

EXAMPLE 3

The procedure of Example 1, supra, is repeated except that half of the mica flakes as used therein are replaced with an equal proportion of chopped glass fiber (OCF, supra.). The test results are given in the Table, below.

EXAMPLE 4

The procedure of Example 1, supra, is repeated except that the proportion of polycarbonate resin as used therein is reduced to 80 parts and 5 parts of chopped glass fiber (OCF, supra.) is added to the mixture of ingredients. The test results obtained are given in the Table, below.

EXAMPLE 5

The procedure of Example 1, supra, is repeated except that the proportion of polycarbonate resin is reduced to 75 parts and the proportion of Kraton ® G-1651 is increased to 10 parts. The test results obtained are given in the Table, below.

EXAMPLE 6

The procedure of Example 1, supra, is repeated except that the proportion of polycarbonate resin is increased to 90 parts and the Kraton ® G-1651 is omitted. The test results obtained are given in the Table, below.

EXAMPLE 7

This example is not an example of the invention but is made for comparative purposes.

What is claimed:

1. A method of improving the flexural modulus of articles blow-molded from a polycarbonate resin composition without significantly adversely affecting the blow-moldability of the resin composition, which comprises; homogeneously blending from 1 to 25 parts by weight of mica particles into the composition.

2. A blow-moldable thermoplastic resin composition, which comprises; a blend of an aromatic blow-moldable polycarbonate resin and a reinforcing proportion of mica particles.

3. The composition of claim 2 wherein the proportion of mica particles is within the range of from 1 to 25 parts by weight of the resin.

4. The composition of claim 2 which further comprises;
   from 65 to 95 parts by weight of said resin;
   from 0 to 15 parts by weight of glass fiber; and
   from 0 to 15 parts by weight of an impact strength modifier.

5. The composition of claim 4 wherein mica particles are present in a proportion of from 5 to 23 parts by weight and glass fiber is present in a proportion of from 5 to 12 parts by weight.

6. The composition of claim 4 wherein the impact strength modifier is present.

7. The composition of claim 6 wherein said modifier is a selectively hydrogenated styrene-butadiene-styrene block copolymer.

8. An article, which comprises:
   a blow-moldable, thermoplastic body, said body comprising;
   a reinforcing agent filled, blow-molded, thermoplastic polycarbonate resin, said agent being mica particles; said body having a flexural modulus of at least 27,000 Kg/cm$^2$ and a notched Izod impact strength of at least about 5 Kg-cm/cm.

9. The article of claim 8 wherein the body further comprises an impact modifier ingredient.

10. The article of claim 9 wherein the modifier is a selectively hydrogenated styrene-butadiene-styrene block copolymer.

* * * * *